United States Patent Office 3,423,193
Patented Jan. 21, 1969

3,423,193
BORATOZIRCONIUM CHLORIDE
James A. Stynes, Lewiston, N.Y., assignor to National Lead Company, New York, N.Y., a corporation of New Jersey
No Drawing. Filed Jan. 9, 1967, Ser. No. 614,762
U.S. Cl. 23—367  11 Claims
Int. Cl. C01b 35/00; C01g 25/04

ABSTRACT OF THE DISCLOSURE

A novel compound called boratozirconium chloride is obtained by the reaction in water of zirconyl chloride and boric acid. The compound, having a composition corresponding to the formula $(HBO_3)(ZrOH)Cl \cdot xH_2O$, is amorphous and water soluble and in small amounts in water produces gels with organic compounds and metallic salts. Boratozirconium bromide may be produced in a similar manner.

BACKGROUND OF THE INVENTION

This invention relates to a novel compound of zirconium containing zirconium, boron, oxygen, hydrogen, and chlorine, as well as to a method for preparing it, and to uses for it.

SUMMARY OF THE INVENTION

By reacting boric acid and zirconyl chloride in aqueous solution there is obtained as a precipitate a novel compound which is hydrated and by analysis has a composition corresponding to the formula $$(HBO_3)(ZrOH)Cl \cdot xH_2O$$

The hydrated compound, which is named boratozirconium chloride, is water soluble and may be used in the production of gels by mixing an aqueous solution of it with organic compounds as well as metallic salts.

DESCRIPTION OF THE PREFERRED EMBODIMENTS

The production of boratozirconium chloride under different conditions is illustrated in the following examples.

EXAMPLE 1

To an aqueous 1.5 M solution of zirconyl chloride ($ZrOCl_2$) boric acid ($H_3BO_3$) is added in an amount equivalent to 2 mols of $H_3BO_3$ per mol of zirconium present. The mixture is heated to 60° C. with stirring for 4 hours whereupon a precipitate is formed which is filtered out, washed with methanol, and dried. Both before and after drying, the product is soluble in water. Analysis of the product after drying at 50° C. shows 13.49% Cl and, calculated as oxides, 46.70% $ZrO_2$ and 13.4% $B_2O_3$. The Cl:Zr mol ratio of this product is 1.01 and the B:Zr mol ratio is 1.02. This is quite close to the theoretical composition in which the Cl:Zr and the B:Zr mol ratios are both 1.

Boratozirconium chloride as precipitated is a hydrated compound having a composition in which the Cl:B:Zr mol ratios are 1:1:1, the formula for which may be written $(HBO_3)(ZrOH)Cl \cdot xH_2O$. The amount of water represented by $x$ varies with the drying conditions.

When boratozirconium chloride is dried in air at 50° C. $x$ is about 3.5 and the product at room temperature has a specific gravity of $2.29 \pm 0.01$ and an index of refraction of $1.57 \pm 0.01$. It forms aqueous solutions that even in concentrations as low as 0.1 M are quite viscous and have a pH of less than 3. Although when examined by X-ray diffraction no crystalline pattern can be obtained, the compound thus being characterized as amorphous, a distinctive infra-red absorption spectrum is obtained. This is set forth in Table I.

Table I.—Absorption spectrum

Frequency (cm.$^{-1}$):
```
3260 _____ (s., b.)
2918 _____ (w.)
1620 _____ (s., sh.)
1146 _____ (m., b.)
951  _____ (m., b.)
724  _____ (w.)
555  _____ (m., b.)
396  _____ (m., b.)
```

Infra-red examination was carried out in the $2.5\mu$–$40\mu$ range on a Perkin Elmer Model 521 infra-red spectrophotometer by the split mull technique using mineral oil and perfluorinated hydrocarbon oil. The letters beside the figures in the table have the following meanings: as applied to the peak width, b.=broad, and sh.=sharp; as applied to the peak height, m.=medium, s.=strong, and w.=weak.

EXAMPLES 2–6

The procedure of Example 1 when carried out in the same way but at temperatures of approximately 32° C., 40° C., 78° C., 100° C., and 120° C. gives products having substantially identical compositions in each instance. In actual experiments mol ratios varied from 0.99 to 1.02 with respect to the Cl:Zr ratio and from 1.00 to 1.04 in the case of the B:Zr ratio in products produced at the several temperatures mentioned and dried at 50° C.

It will be understood that boratozirconium chloride, as indicated in the formula set out above, is hydrated and the number of molecules of water bound thereto is not definitely fixed. Thus, when freshly precipitated the water content will be much higher than after drying, more and more water being removed as the drying temperature is raised. The products produced in the foregoing examples will, therefore, vary somewhat in actual composition when dried at different temperatures although the B:Cl:Zr ratios will remain constant. Since boratozirconium chloride begins to decompose at about 110° C. it is usually desirable to employ drying temperatures no higher than about 100° C.

In the foregoing examples, as in other instances, what appear to be discrepancies in the B:Zr ratios may be encountered unless unreacted boric acid is carefully and substantially completely washed out. The washing is conveniently accomplished with methanol or ethanol, but other suitable solvents may be employed.

An increase or decrease in the concentration of the zirconyl chloride solution between about 1 M and 2 M, when carrying out the process set forth in Example 1, results in the formation of products substantially identical with those of Examples 1–6 and having B:Zr and Cl:Zr mol ratios of substantially 1 in each case. It is found, however, that the yield of product is rather low at the lower $ZrOCl_2$ concentrations.

The use of reacting mixtures in which the mol ratios of B:Zr range from 0.5 to 3.6 gives products which when analyzed do not show significant variations from the composition given above. However, yields are considerably increased for the same period of reaction by relatively high B:Zr ratios in the reactants.

It has also been determined that, under otherwise equivalent conditions, increased acidity in the reacting mixture increases the yield while not affecting the composition of the products. The increased acidity can be produced by addition of HCl to the zirconyl chloride-boric acid mixture in amounts up to that sufficient to produce a Cl:Zr mol ratio of 4 in the reacting mixture. A convenient way to increase the acidity of the reacting mixture is to form the zirconyl chloride solution by adding zirconium tetrachloride ($ZrCl_4$) to water, the hydrolysis of the tetrachloride giving the equivalent of two mols of HCl.

While boric acid has been found most suitable for use in preparing boratozirconium chloride, other boron compounds which in acid media form boric acid may be employed. Among such compounds are sodium metaborate, calcium metaborate, calcium tetraborate, borax, and, of course, boric oxide.

As previously mentioned, boratozirconium chloride readily forms gels with a large number of materials in aqueous solution. In forming such gels the boratozirconium chloride and the material are mixed in solution, at least one, preferably the boratozirconium chloride, being previously dissolved. In any case, however, the other constituent material must be soluble in water to some extent. The following two examples illustrate gel formation with boratozirconium chloride.

EXAMPLE 7

To 0.5 g. of boratozirconium chloride dissolved in 12 ml. of water there is added with stirring 25 ml. of methanol. The solution becomes viscous and sets to a clear, rigid gel in about 2 hours.

Example 7 is typical of the production of gels with boratozirconium chloride from organic compounds. Among the many organic compounds which have been successfully produced in gel form by this method are ethanol, isopropanol, acetone, tetrahydrofuran, and dioxane. The amount of boratozirconium chloride necessary to obtain firm gels is in the range from about 0.25% to about 3%, based on the total mixture.

EXAMPLE 8

To 0.5 g. of boratozirconium chloride dissolved in 50 ml. of water there is added with stirring 1 g. of sodium chloride. The latter dissolves and in about 2 hours a clear gel is formed.

Example 8 is typical of the production of gels with boratozirconium chloride from aqueous solutions of metallic salts. Among the metal salt solutions which have been produced in gel form by this method are: $KNO_3$, $CuCl_2$, $MgCl_2$, $CaCl_2$, $KMnO_4$, $NH_4Cl$, $BaI_2$, $CeCl_3$, $Co(NO_3)_2$, NaSCN, LiCl, $MnCl_2$, $NiCl_2$. In addition to those salts mentioned, metal salts of strong monobasic acids in general form gels with boratozirconium chloride provided the salt solution in water is substantially neutral or no more acidic than the boratozirconium chloride solution.

In gelling sodium chloride solutions concentrations of about 2% NaCl and about 1% boratozirconium chloride are quite satisfactory. With other salts the preferred concentrations will vary somewhat. However, based on the total mixture, a salt concentration of from about 0.5% to about 6% and a boratozirconium chloride concentration of from about 0.25% to about 2.5% will produce gels with other salts.

Although in some instances the gels produced with boratozirconium chloride are somewhat soft or fluid, by the use of proper proportions of reactions non-yielding gels, i.e. gels which are not plastic and cannot be materially changed in shape without fracture, can be readily obtained. The gels may be used for many purposes.

The following example illustrates use of one such gel.

EXAMPLE 9

A firm gel, such as one obtained by mixing 10 g. of boratozirconium chloride dissolved in 225 ml. of water with 500 ml. of ethanol and allowing the mixture to set is cut into cubes approximately 3 cm. on each side. These blocks are an easily handled and used solid fuel which is readily ignited. The ethanol burns freely with a hot flame and the blocks retain their shape during burning although they diminish in size.

Although in the foregoing description the preparation and use of only boratozirconium chloride is described, it will be understood that boratozirconium bromide may be formed in an analagous manner and will have very similar properties.

Percentages, proportions, and ratios specified in the present specification and the accompanying claims are, unless otherwise specified, by weight.

I claim:
1. A water soluble zirconium compound which when dried in air at 50° C. has a composition which may be written $(HBO_3)(ZrOH)Cl \cdot xH_2O$ in which $x$ is about 3.5 and is characterized by a specific gravity and an index of refraction, at room temperature of about 2.29 and 1.57, respectively, and by its ability in aqueous solution to form gels with metallic salts and organic compounds.

2. A process for producing the product of claim 1 which comprises reacting $ZrOCl_2$ and $H_2BO_3$ in water to form a precipitate, and separating, washing, and drying said precipitate.

3. A process as set forth in claim 2 in which said $ZrOCl_2$ and $H_3BO_3$ are present in such proportions that the B:Zr mol ratio in the reacting mixture is from 0.5 to 3.6.

4. A process as set forth in claim 2 in which the reaction is carried out at a temperature in the range from about 30° C. to about 120° C.

5. A process as set forth in claim 2 in which the Cl:Zr mol ratio is from 2:1 to 4:1.

6. A process as set forth in claim 3 in which the reaction is carried out at a temperature in the range from about 30° C. to about 120° C.

7. A process as set forth in claim 6 in which the Cl:Zr mol ratio is from 2:1 to 4:1.

8. A process as set forth in claim 2 in which the product is dried at a temperature not exceeding about 100° C.

9. A process as set forth in claim 8 in which the product is dried at a temperature not exceeding about 100° C.

10. A gel consisting essentially of boratozirconium chloride as set forth in claim 1, water and a water-soluble organic material.

11. A gel consisting essentially of boratozirconium chloride as set forth in claim 1, water, and a water-soluble metallic salt.

References Cited

Mellor: Comprehensive Treatise on Inorganic and Theoretical Chemistry, vol. 5, p. 137 (1924).

EARL C. THOMAS, *Primary Examiner.*

HOKE S. MILLER, *Assistant Examiner.*

U.S. Cl. X.R.

23—315.